(12) United States Patent
Bense

(10) Patent No.: US 10,174,863 B2
(45) Date of Patent: Jan. 8, 2019

(54) METHOD FOR MONITORING A VALVE OF AN AIRCRAFT ENGINE

(71) Applicant: SAFRAN AIRCRAFT ENGINES, Paris (FR)

(72) Inventor: William Bense, Melun (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 212 days.

(21) Appl. No.: 14/909,644

(22) PCT Filed: Aug. 4, 2014

(86) PCT No.: PCT/FR2014/052024
§ 371 (c)(1),
(2) Date: Feb. 2, 2016

(87) PCT Pub. No.: WO2015/019010
PCT Pub. Date: Feb. 12, 2015

(65) Prior Publication Data
US 2016/0186890 A1     Jun. 30, 2016

(30) Foreign Application Priority Data

Aug. 9, 2013  (FR) ..................................... 13 57916

(51) Int. Cl.
*F16K 37/00*        (2006.01)
*G05B 23/02*        (2006.01)

(52) U.S. Cl.
CPC ...... *F16K 37/0091* (2013.01); *F16K 37/0075* (2013.01); *F16K 37/0083* (2013.01);
(Continued)

(58) Field of Classification Search
CPC ............. F16K 37/0091; F16K 37/0083; F16K 37/0075
See application file for complete search history.

(56) References Cited

U.S. PATENT DOCUMENTS 5,329,465 A       7/1994   Arcella et al.
2010/0155634 A1  6/2010   Do Amaral et al.
(Continued)

FOREIGN PATENT DOCUMENTS

EP     0 315 391 A2    5/1989
EP     2 202 600 A2    6/2010
(Continued)

OTHER PUBLICATIONS

International Search Report dated Nov. 18, 2014, in PCT/FR2014/052024 Filed Aug. 4, 2014.
(Continued)

*Primary Examiner* — Paul M. West
(74) *Attorney, Agent, or Firm* — Oblon, McClelland, Maier & Neustadt, L.L.P

(57) ABSTRACT

A method and a system are provided for detecting first signs of failure in an aircraft engine valve. The system includes an acquisition device configured to acquire output pressure measurements of the valve and command and context data related to the valve, and a processing device configured to define a set of indicators of first signs of failure as a function of the output pressure measurements and the command and context data. The processing device is configured to monitor a change over time in each indicator of the set of indicators of first signs of failure. The processing device is configured to detect a possible deviation of at least one indicator among the set of indicators, the deviation representing the first signs of failure of the valve.

10 Claims, 4 Drawing Sheets

(52) U.S. Cl.
CPC ...... *G05B 23/0229* (2013.01); *G05B 23/0232* (2013.01); *G05B 23/0235* (2013.01); *G05B 23/0237* (2013.01)

(56) References Cited

U.S. PATENT DOCUMENTS

2013/0154841 A1\* 6/2013 Kucera .............. F16K 37/0091
  340/605
2013/0325286 A1 12/2013 Lacaille

FOREIGN PATENT DOCUMENTS

WO 2009/072487 A1 6/2009
WO 2012/110733 A1 8/2012

OTHER PUBLICATIONS

French Search Report dated May 9, 2014, in FR 13 57916 Filed Aug. 9, 2013.
U.S. Appl. No. 14/781,181, filed Sep. 29, 2015, Bense.
U.S. Appl. No. 14/956,851, filed Dec. 2, 2015, Blanchard, et al.

\* cited by examiner

METHOD FOR MONITORING A VALVE OF AN AIRCRAFT ENGINE

TECHNICAL FIELD

The present invention relates to the field of systems for monitoring a valve in an aircraft engine and more particularly, the detection of first signs of failure of an NAI type valve.

STATE OF THE PRIOR ART

An aircraft engine comprises a plurality of valves required to control the flow rates of different fluids circulating in the engine. Generally speaking, the valves comprise position sensors which make it possible to monitor their state of operation. Monitoring then consists in comparing the commanded position of the valve with the position detected by the position sensors. A fault or damage to one or more position sensors generates warning messages which can lead to a more or less long immobilisation of the aircraft for a maintenance intervention.

Furthermore, certain valves such as NAI (Nacelle Anti-Icing) valves do not comprise position detection means and it is then difficult to monitor their correct operation. In fact, the detection of failures is all the more difficult when it is not possible to record the failure directly, but only its effects.

NAI valves are employed in pneumatic anti-icing systems used to avoid icing up of the nacelle. If the NAI valve remains blocked in open position, there is a risk of overheating of the de-iced components. On the contrary, if the valve remains blocked in closed position, icing up of the nacelle can lead to the ingestion of ice by the engine. In order to avoid these problems, it is advantageous to detect the first signs of failure of these valves before they remain blocked.

The aim of the present invention is consequently to propose a method and system for detecting which is simple to implement and which is capable of detecting rapidly and with precision and reliability the first signs of failure in an aircraft engine valve and forecasting anomalies.

DESCRIPTION OF THE INVENTION

The present invention is defined by a method for detecting first signs of failure in an aircraft engine valve, comprising the following steps:

acquisition of output pressure measurements of said valve and command and context data related to said valve, definition of a set of indicators of first signs of failure as a function of said output pressure measurements and said command and context data, monitoring a change over time of each indicator of said set of indicators of first signs of failure, detection during said monitoring of a possible deviation of at least one indicator among said set of indicators, said deviation representing the first signs of failure of said valve.

The method of the present invention is very simple to implement with a minimum number of calculation operations. Furthermore, this method makes it possible to detect the first signs of failure of a valve not comprising a position sensor, mainly from the output pressure measurement.

According to a preferred embodiment of the invention, the detection of a deviation of at least one indicator comprises the following steps:

determination for each indicator of a slope, called estimated slope, associated with the observed change over time of the indicator, and detection of a possible abnormal behaviour of an estimated slope revealing a deviation of the indicator associated with said estimated slope.

Advantageously, the detection of an abnormal behaviour of an estimated slope comprises at least one event among the following events: a break in slope, a slope above a first predetermined threshold value, and a slope below a second predetermined threshold value.

Advantageously, the detection of an abnormal behaviour of an estimated slope comprises the following steps:

determination for each indicator of another slope, called expected slope, associated with a natural change over time of each indicator, calculation for each indicator of a guiding discrepancy between the estimated slope and the corresponding expected slope, and comparison of said guiding discrepancy related to each indicator with a corresponding predetermined warning threshold interval.

Thus, any deviation may be detected very quickly with very little calculation and with great precision. The predetermined warning threshold interval may be selected as a function of the indicator.

Advantageously, the method comprises a learning phase to define the natural change over time of each indicator and to determine the expected slope related to each indicator from its natural change over time.

This makes it possible to compare with great efficiency the observed change with the natural change of an indicator in order to detect the slightest variation in slope.

Advantageously, the method comprises a triggering of a warning of first signs of failure if said guiding discrepancy related to at least one indicator is beyond said predetermined warning threshold interval in the course of a determined set of flights.

According to a variant, the method comprises the following steps:

triggering of a low level warning if said guiding discrepancy related to an indicator reduces in the course of a determined set of flights, triggering of a medium level warning if said guiding discrepancy related to an indicator remains constant in the course of a determined set of flights, and triggering of a high level warning if said guiding discrepancy related to an indicator increases in the course of a determined set of flights.

According to another variant, the method comprises the following steps:

triggering of a low level warning if a single indicator shows a guiding discrepancy beyond said predetermined warning threshold interval, triggering of a medium level warning if two indicators show a guiding discrepancy beyond said predetermined warning threshold interval, and triggering of a high level warning if at least three indicators show a guiding discrepancy beyond said predetermined warning threshold interval.

According to another preferred embodiment of the invention, the method comprises the following steps:

extrapolation of the observed change over time of each indicator up to a predetermined horizon of number of flights, and calculating for each indicator a probability of exceeding a predetermined projected threshold by the value of the indicator at the horizon.

This makes it possible to forecast a possible anomaly of the valve at the given horizon.

According to yet another preferred embodiment of the invention, the method comprises the following steps:

definition for each indicator of a measurement of probability of exceeding a predetermined projected threshold, extrapolation of the observed change over time of each indicator, and calculation of a projected horizon for each indicator at the end of which said probability measurement is reached.

This makes it possible to forecast the lifetime of the valve.

Advantageously, the context data comprise ambient pressure data, valve supply pressure data and temperature measurements, and the command data comprise instants of command to open and to close said valve.

The acquisition of command and context data does not require additional means while making it possible to refine the definition of the indicators. In fact, the context data are easily available from a monitoring system already existing in the aircraft and the command data are also available from an on-board computer. Furthermore, the context data serve to standardise the indicators in order to enable the system for detecting to operate identically whatever the acquisition conditions.

Advantageously, said set of indicators of first signs of failure comprises one or more indicators among the following indicators:

time delay to open said valve determined by the time delay between the instant of command to open the valve and the instant where the output pressure verifies a predetermined function indicative of an open valve, time delay to close said valve determined by the time delay between the instant of command to close the valve and the instant where the output pressure is around equal to ambient pressure, opening state of said valve determined by a comparison between the output pressure and said predetermined function indicative of an open valve, and closing state of said valve determined by a comparison between the output pressure and the ambient pressure.

The invention also relates to a system for detecting first signs of failure in an aircraft engine valve, comprising:

acquisition means configured to acquire output pressure measurements of said valve and command and context data related to said valve, processing means configured to define a set of indicators of first signs of failure as a function of said output pressure measurements and said command and context data, processing means configured to monitor a change over time of each indicator of said set of indicators of first signs of failure, and processing means configured to detect a possible deviation of at least one indicator among said set of indicators, said deviation representing the first signs of failure of said valve.

These indicators envisage all the operating scenarios of the valve and are thus very relevant for detecting first signs of failure.

The invention also relates to an aircraft engine, comprising a system for detecting according to the above characteristics.

BRIEF DESCRIPTION OF THE DRAWINGS

Other characteristics and advantages of the invention will become clear from reading preferential embodiments of the invention made with reference to the appended figures, among which.

DETAILED DESCRIPTION OF PARTICULAR EMBODIMENTS

The underlying concept of the invention is based on monitoring relevant indicators over time to detect first signs of failure constructed practically from the pressure measurement.

Figure 1:
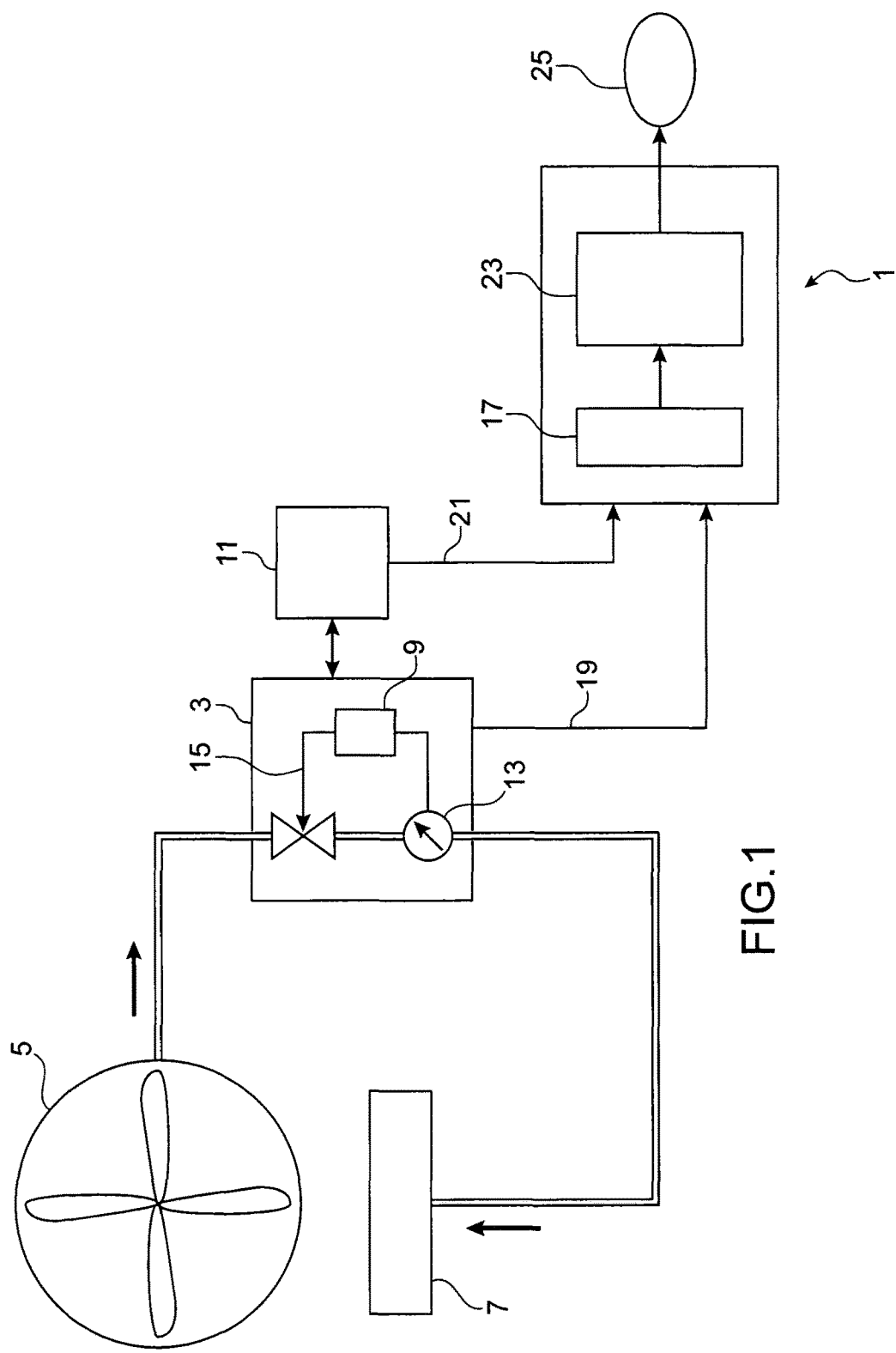
FIG. 1 schematically illustrates a system for detecting first signs of failure in an aircraft engine valve, according to the invention.

FIG. 1 schematically illustrates a system for detecting 1 first signs of failure of a valve 3 of an aircraft engine, according to the invention.

An air bleed valve 3 of PRSOV (Pressure Regulating Shut Off Valve) type withdraws air from the engine compressor 5 to convey it to other items of equipment of the aircraft. For example in the case of a NAI valve, the hot air withdrawn from the compressor 5 is conveyed to means for de-icing 7 the nacelle of the aircraft engine.

It will be noted that in normal operation, this type of butterfly valve does not comprise any intermediate position, the position being either open or closed.

Usually, the valve 3 comprises command means 9 capable of commanding and regulating the position of opening and closing of the valve 3. The position of the valve 3 is triggered by the command means 9 as a function of signals received from an on-board computer 11 and/or command elements which can be actuated by the aircrew.

Moreover, the valve 3 comprises a pressure sensor 13 which measures the output pressure supplied by the valve 3. The pressure reading is sent via a control loop 15 to the command means 9 which then adjust the position of the valve 3 as a function of the pressure measurement in order to maintain an appropriate output pressure.

The system for detecting 1 is configured to use the output pressure measurement in order to detect the first signs of failure of the valve 3.

More particularly, the system for detecting 1 comprises acquisition means 17 for acquiring the output pressure values (arrow 19) of the valve measured by the pressure sensor as well as command and context data (arrow 21) of the valve.

The context data may comprise ambient pressure data, valve 3 supply pressure data and temperature measurements for example at the valve 3 supply level.

As an example, the context data may be obtained from an already existing on-board monitoring system and/or a computer 11. In fact, the aircraft usually comprises a monitoring system (not represented) which reads and records time measurements comprising engine operating data as well as context data to monitor the correct operation of the engine.

In a variant, the context data may be obtained directly from specific sensors (not represented) configured to measure the parameters of said context data.

Otherwise, the command data comprise the instants of command to open and to close the valve 3 obtained for example from the on-board computer 11.

The system for detecting 1 also comprises processing means 23 to define a set of indicators of first signs of failure as a function of output pressure measurements and command and context data. It will be noted that the set of indicators may comprise a single or several relevant indicator(s).

A first indicator may relate to the time delay to close the valve 3 which may be determined by the time delay between the instant of command to close the valve 3 and the instant where the output pressure is around equal to the ambient pressure potentially after a certain confirmation time.

A second indicator relates to the state of closing of the valve 3 in order to ensure that the valve is airtight when it is closed. This may be determined by a comparison between the output pressure and the ambient pressure.

It will be noted that after the command to close the valve 3, a certain confirmation time is awaited which is longer than the normal time delay to close the valve before taking into account the output pressure measurements in order to be sure that a normally operating valve has had the necessary time to close. Advantageously, the output pressure is measured throughout a predetermined period in order to calculate an average of these measurements.

Figure 2:
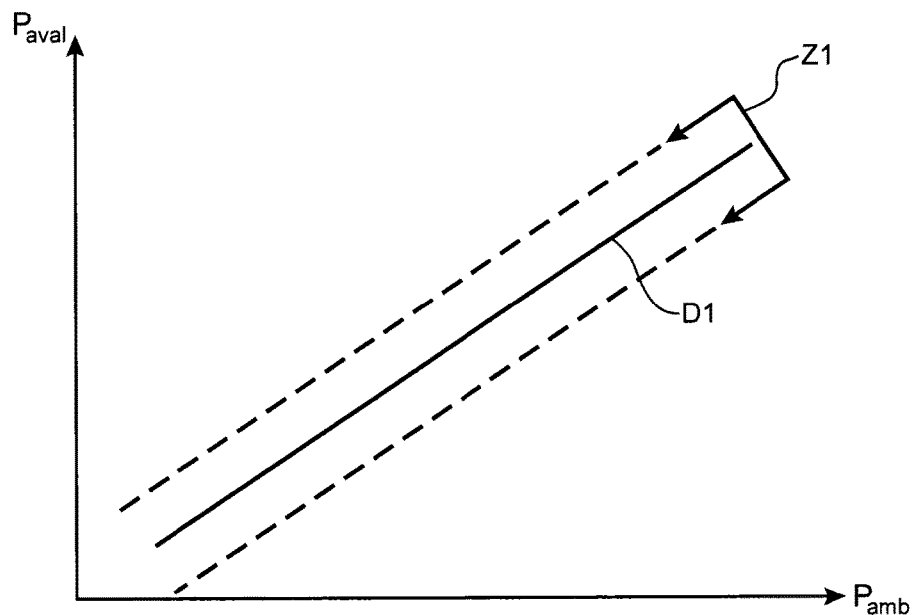
FIG. 2 is a graph illustrating the output pressure as a function of the ambient pressure for a normally closed valve.

FIG. 2 is a graph illustrating the output pressure $P_{aval}$ as a function of the ambient pressure $P_{amb}$ for a normally closed valve. In fact, for a hermetically closed valve, the output pressure $P_{aval}$ is a linear function represented by a straight line D1 of nominal pressure going through origin. The straight line D1 may be surrounded by an acceptable zone Z1 of dispersion due to measurement inaccuracy.

A third indicator relates to the time delay to open the valve 3. This opening time delay is determined by the measurement of the time delay between the instant of command to open the valve 3 and the instant where the output pressure $P_{aval}$ verifies a predetermined function indicative of an open valve potentially after a certain confirmation time.

This predetermined function depends on the supply pressure.

A fourth indicator relates to the state of opening of the valve 3. This may be determined by a comparison between the output pressure $P_{aval}$ and said predetermined function indicative of a normally open valve. The comparison may be carried out by calculating the ratio between the measured output pressure and the corresponding theoretical output pressure conforming to said predetermined function, knowing that for normal operation this ratio must be close to unity.

By precaution and as indicated previously, a certain confirmation time longer than the time delay to open the valve 3 is awaited before taking into account the output pressure measurements in order to be sure that a normally operating valve has had the time required to open. Similarly, the output pressure $P_{aval}$ is advantageously measured over a predetermined period in order to calculate an average of these measurements.

Figure 3:
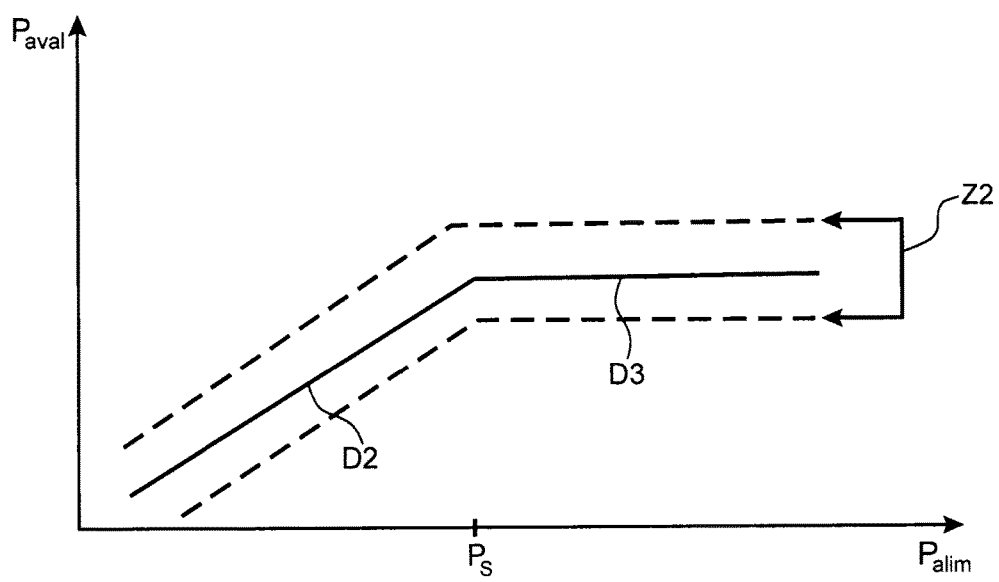
FIG. 3 is a graph illustrating the output pressure as a function of the supply pressure for a normally open valve.

FIG. 3 is a graph illustrating the output pressure $P_{aval}$ as a function of the supply pressure $P_{alim}$ for a normally open valve. Here, the output pressure $P_{aval}$ is represented by a predetermined piecewise affine type function. The curve of said predetermined function is constituted of first and second segments of straight lines D2 and D3. The first segment of straight line D2 represents an equality between the output pressure $P_{aval}$ and the supply pressure $P_{alim}$ when the latter is below a predetermined threshold pressure $P_s$. The second segment of straight line D3 represents the fact that the output pressure $P_{aval}$ remains stationary at a value equal to the predetermined threshold pressure $P_s$ when the supply pressure $P_{alim}$ is above said threshold pressure $P_s$. The segments of straight lines D2 and D3 are surrounded by a dispersion zone Z2 due to measurement inaccuracy.

Obviously, in the case of a normally open valve 3, the output pressure $P_{aval}$ is above the ambient pressure $P_{amb}$ as illustrated in the graph of FIG. 3.

Advantageously, the processing means 23 are moreover configured to normalise or standardise the indicators as a function of all the other indicators of first signs of failure and one or more context data according to a conventional regression technique. This makes it possible to form a set of indicators which are normalised and independent vis-à-vis the context.

It will be noted that the system and method for detecting according to the invention preferably apply to a normalised indicator but can also apply to a non-normalised indicator. In the interest of simplification, the term "indicator" hereafter designates a normalised indicator.

Figure 4:
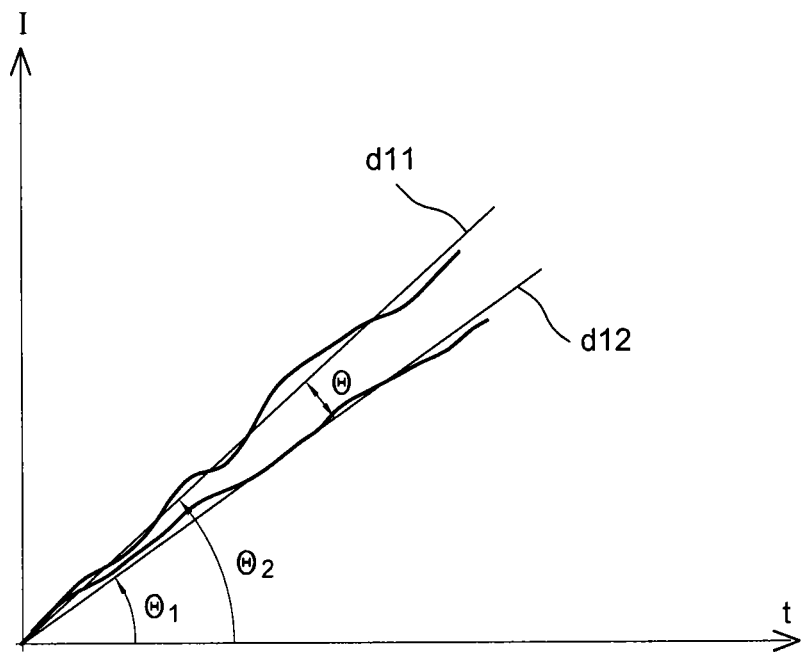
FIG. 4 is a graph illustrating the change over time of an indicator of first signs of failure, according to the invention.

FIG. 4 is a graph illustrating an example of the change over time of an indicator of first signs of failure, according to the invention.

Here, the time t is represented by a number of cycles of opening (or closing) the valve and consequently, the curve indicates the variation in the indicator as a function of the number of cycles. In a variant, the time t may be represented by the number of flights of the aircraft which is obviously correlated to the number of cycles.

The processing means 23 are moreover configured to monitor the change over time of each indicator I of the set of indicators of first signs of failure.

Thus, by monitoring the different indicators, the processing means 23 are suited for detecting a possible deviation of at least one indicator I, the deviation representing the first signs of failure of the valve.

Advantageously, the deviation of an indicator I is detected thanks to a slope $\theta_1$ of a straight line d11 associated with the change of the indicator. In fact, the processing means 23 are configured to determine for each indicator a slope, called estimated slope $\theta_1$, associated with the observed (or monitored) change over time of the indicator.

It will be noted that in the general case (not represented), the indicator almost does not change and the slope remains practically zero.

In the case where the observed change over time of the indicator corresponds to a practically affine curve, the slope may be directly determined, for example, by a technique of linear regression over a given interval of the curve. If not, the processing means 23 are configured to transform firstly the observed change over time of the indicator into a corresponding affine representation. For example, if the observed change over time of the indicator is exponential, then a logarithmic transformation is carried out to return to the linear case before calculating by linear regression the estimated slope of change of the indicator. The processing means 23 are configured to detect a possible abnormal behaviour of the estimated slope which is revealing of a deviation of the indicator associated with this slope.

As an example, an abnormal behaviour of an estimated slope corresponds to a break in slope, or instead to the fact that the slope is above a first predetermined threshold value or below a second predetermined threshold value. A warning 25 of first signs of failure is then triggered by the processing means 23 when an abnormal behaviour of an estimated slope has been detected.

According to a variant, an abnormal behaviour of a slope associated with an indicator may be detected by comparing the estimated slope $\theta_1$ with a sound slope of a straight line d12 associated with a sound change of the indicator.

In fact, according to a preferred embodiment of the invention, the processing means 23 are configured to determine for each indicator another slope, called expected slope $\theta_2$, of the straight line d12 associated with the sound or natural change over time of each indicator.

It will be noted that as previously, if the natural change over time does not correspond to a quasi-affine function, it is transformed into an affine representation in order to be able to calculate the expected slope associated with the natural change over time of the indicator.

The processing means 23 are moreover configured to calculate for each indicator a guiding discrepancy $\theta$ between the estimated slope $\theta_1$ and the corresponding expected slope $\theta_2$. Then, the processing means 23 compare the guiding discrepancy $\theta$ related to each indicator with a corresponding predetermined threshold interval of warning of first signs of failure. Advantageously, the warning threshold interval is chosen as a function of the indicator, the warning level and the detection reliability.

The natural change over time of an indicator may be determined either theoretically from known a priori behaviour of the indicator, or from data acquired during a learning phase.

In fact, a learning phase may be used to define the natural change over time of each indicator from sound data. The sound data may for example stem from data recorded during first flights or already known sound flights.

Otherwise, in the case where the guiding discrepancy related to at least one indicator is beyond the predetermined warning threshold interval (i.e., greater than the upper bound of the interval or smaller than the lower bound of the interval), a warning 25 of detection of first signs of failure is triggered by the processing means 23. In order to avoid false alerts, the warning may be transmitted if the guiding discrepancy related to at least one indicator remains beyond the predetermined warning threshold interval during a determined set of flights, for example, during a determined number k of cycles/flights among the last n cycles/flights.

According to a variant, the processing means 23 trigger several warning levels 25 as a function of the variation over time of the guiding discrepancy relating to an indicator. For example, a low level warning is triggered if the guiding discrepancy relating to an indicator reduces in the course of a determined set of flights. Moreover, a medium level warning is triggered if the guiding discrepancy related to the indicator remains constant in the course of the determined set of flights, and finally, a high level warning is triggered if the guiding discrepancy increases in the course of the determined set of flights.

According to yet another variant, the processing means 23 trigger several warning levels as a function of the number of indicators which show discrepancies beyond a predetermined warning threshold interval. For example, a low level warning is triggered if a single indicator shows a guiding discrepancy beyond the predetermined warning threshold interval. A medium level warning is triggered if two indicators show a guiding discrepancy beyond the predetermined warning threshold interval, and finally, a high level warning is triggered if at least three indicators show a guiding discrepancy beyond the predetermined warning threshold interval.

Furthermore, after a triggering of warning 25 of detection of first signs of failure according to any of the above variants, the guiding discrepancy $\theta$ may then be compared to a second threshold interval of failure in order to detect if the valve has already failed and to trigger a failure warning in the case where this second threshold interval of failure is exceeded.

Figure 5:
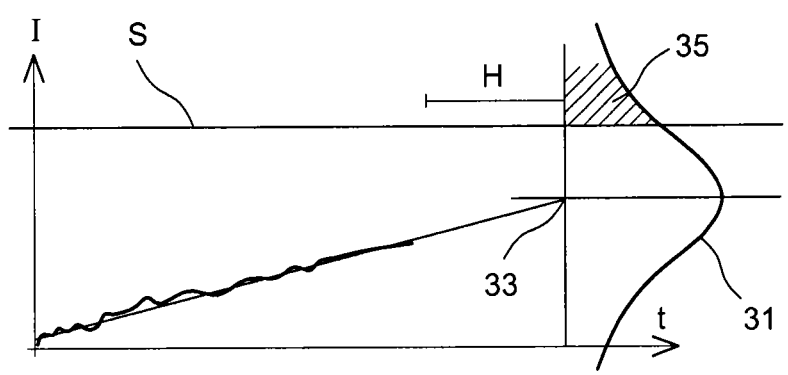
FIG. 5 is a graph schematically illustrating a method for forecasting first signs of failure according to a preferred embodiment of the invention.

FIG. 5 is a graph schematically illustrating a method for forecasting first signs of failure according to a preferred embodiment of the invention.

The graph illustrates an example where the change over time of an indicator I of first signs of failure is linear. More particularly, the graph illustrates a curve of change of an indicator I as a function of the number of cycles of opening the valve. In a variant, the time t may be represented by the number of flights.

The processing means 23 are configured to extrapolate the observed change over time of each indicator up to a predetermined horizon H of number of flights. In fact, the processing means 23 recover at the variable point of the change, the history of the change in order to extrapolate it up to the horizon H. It will be noted that it is advantageous to carry out the extrapolation from a shorter history (for example, the last ten or twenty points) when the behaviour of the indicator begins to change.

Otherwise, the horizon H is parameterable as a function of the indicator and the nature of its change. For example, the horizon H for an indicator showing a break in slope may be chosen lower than that of an indicator changing uniformly. As an example, the horizon H may be selected in an interval comprised between 1 flight and 100 flights with a nominal range between 10 and 20 flights.

Moreover, the processing means 23 are configured to calculate for each indicator a probability of exceeding a projected threshold S. More precisely, the probability of exceeding measures the probability that the value of the indicator at the horizon H exceeds a predetermined projected threshold S. As an example, it is possible to use a normal or Student law to evaluate the probability of exceeding.

In particular, the graph of FIG. 5 shows a probability density of the normal law 31 (i.e., a Gaussian distribution) centred on the estimated value 33 of the indicator at the horizon. The area of the hatched part 35 of the probability density 31 which is situated above the projected threshold S then represents the probability of exceeding this threshold by the value of the indicator at the horizon knowing that the total area under the curve equals 1.

The projected threshold level S is obviously chosen by the expert in valves as a function of the indicator and the desired reliability. For example, for a valve which usually takes one to four seconds to open, the expert can choose a threshold of five seconds in the graph related to the change of the indicator of the time delay to open the valve.

Figure 6:
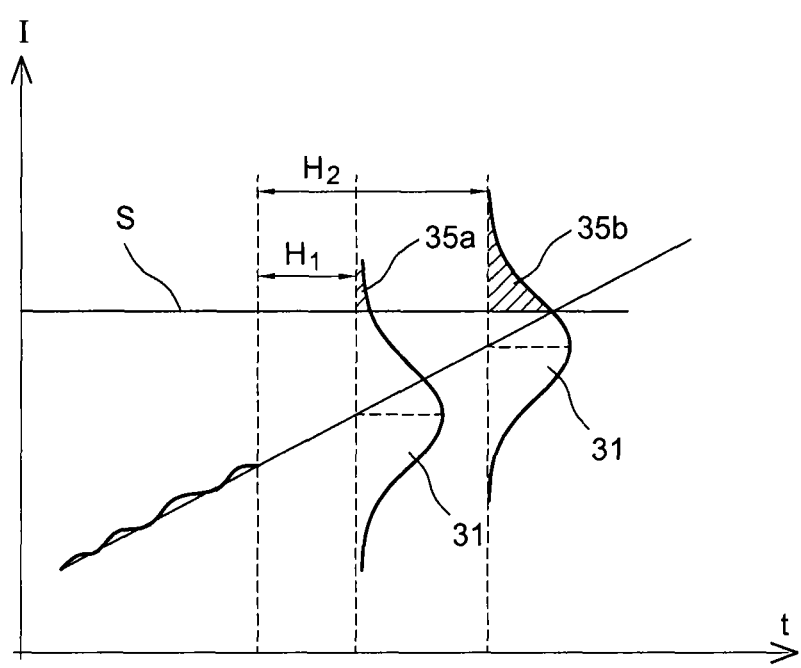
FIG. 6 is a graph schematically illustrating a method for forecasting the lifetime of the valve according to a preferred embodiment of the invention.

FIG. 6 is a graph schematically illustrating a method for forecasting the lifetime of the valve according to a preferred embodiment of the invention.

According to this embodiment, the system for detecting aims to forecast the duration at the end of which the valve will show (with a predetermined probability) the first signs of failure.

In this case, a predetermined measurement of probability of exceeding a projected threshold is firstly chosen and then the time (or more exactly the number of flights or cycles) necessary to reach this measurement is calculated.

Thus, the processing means 23 define firstly for each indicator a predetermined measurement of probability reflecting the exceeding by the indicator of a predetermined projected threshold.

Then, the processing means 23 extrapolate the observed change over time of each indicator and then calculate for each indicator the projected horizon at the end of which the predetermined measurement of the probability is reached.

The example of FIG. 6 shows a first horizon $H_1$ associated with a probability of exceeding 35a less than 5% as well as a second horizon $H_2$ associated with a probability of exceeding 35b less than 20%.

It will be noted that the system for detecting 1 may be integrated in a specific unit or form part of an existing electronic unit. Advantageously, it is possible to exploit the acquisition and processing means of an on-board computer 11 in the aircraft or in a computer integrated in the aircraft engine of EMU (Engine Monitoring Unit) type to exploit the system for detecting 1 according to the invention. In particular, the computer 11 may be used to run a computer programme saved in the storage means of the computer and comprising code instructions for the implementation of the method for detecting according to the invention.

The invention claimed is:

1. A method for detecting first signs of failure in an aircraft engine valve, comprising:
   acquiring of output pressure measurements of said valve and command and context data related to said valve,
   defining of a set of indicators of first signs of failure as a function of said output pressure measurements and said command and context data,
   monitoring a change over time of each indicator of said set of indicators of first signs of failure, and
   detecting during said monitoring of a possible deviation of at least one indicator among said set of indicators, said deviation representing the first signs of failure of said valve.

2. The method according to claim 1, wherein the detecting of a deviation of at least one indicator comprises:
   determining for each indicator of a slope, called estimated slope, associated with the observed change over time of the indicator, and
   detecting of a possible abnormal behavior of an estimated slope revealing a deviation of the indicator associated with said estimated slope.

3. The method according to claim 2, wherein the detecting of an abnormal behavior of an estimated slope comprises at least one event among the following events: a break in slope, a slope above a first predetermined threshold value, and a slope below a second predetermined threshold value.

4. The method according to claim 2, wherein the detecting of an abnormal behavior of an estimated slope comprises:
   determining for each indicator of another slope, called expected slope, associated with a natural change over time of each indicator,
   calculating for each indicator a guiding discrepancy, between the estimated slope and the corresponding expected slope, and
   comparing of said guiding discrepancy related to each indicator with a corresponding predetermined warning threshold.

5. The method according to claim 4, further comprising:
   a learning phase to define the natural change over time of each indicator and to determine the expected slope related to each indicator from its natural change over time.

6. The method according to claim 1, further comprising:
   extrapolating of the observed change over time of each indicator up to a predetermined horizon of number of flights, and
   calculating for each indicator a probability of exceeding a predetermined projected threshold by the value of the indicator at the horizon.

7. The method according to claim 1, wherein the context data comprise ambient pressure data, valve supply pressure data and temperature measurements, and the command data comprise instants of command to open and to close said valve.

8. The method according to claim 7, wherein said set of indicators of first signs of failure comprises one or more indicators among the following indicators:
   a time delay to open said valve determined by the time delay between the instant of command to open the valve and the instant where the output pressure verifies a predetermined function indicative of an open valve,
   a time delay to close said valve determined by the time delay between the instant of command to close the valve and the instant where the output pressure is around equal to the ambient pressure,
   a state of opening of said valve determined by a comparison between the output pressure and said predetermined function indicative of an open valve, and
   a state of closing of said valve determined by a comparison between the output pressure and the ambient pressure.

9. A system for detecting first signs of failure in an aircraft engine valve, comprising:
   an acquisition device configured to acquire output pressure measurements of said valve and command and context data related to said valve, and
   a processing device configured to define a set of indicators of first signs of failure as a function of said output pressure measurements and said command and context data, wherein
   the processing device is configured to monitor a change over time of each indicator of said set of indicators of first signs of failure, and
   the processing device is configured to detect a possible deviation of at least one indicator among said set of indicators, said deviation representing the first signs of failure of said valve.

10. An aircraft engine, comprising:
    the system for detecting according to claim 9.

* * * * *